US012802306B2

(12) United States Patent
Bhakthavatsalam et al.

(10) Patent No.: US 12,802,306 B2
(45) Date of Patent: Nov. 17, 2026

(54) THEMATIC VARIATION GENERATION FOR AI-ASSISTED GRAPHIC DESIGN

(71) Applicant: Microsoft Technology Licensing, LLC, Redmond, WA (US)

(72) Inventors: Sumithra Bhakthavatsalam, Kirkland, WA (US); Mayura Vijayendra Bisineer, Cupertino, CA (US); Gongjie Qi, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 18/536,644

(22) Filed: Dec. 12, 2023

(65) Prior Publication Data

US 2025/0191262 A1 Jun. 12, 2025

(51) Int. Cl.

| | |
|---|---|
| ***G06T 11/60*** | (2026.01) |
| ***G06F 40/40*** | (2020.01) |
| ***G06T 7/12*** | (2017.01) |
| ***G06T 11/10*** | (2026.01) |

(52) U.S. Cl.

CPC .............. *G06T 11/60* (2013.01); *G06F 40/40* (2020.01); *G06T 7/12* (2017.01); *G06T 11/10* (2026.01)

(58) Field of Classification Search

CPC ......... G06T 11/60; G06T 7/12; G06T 11/001; G06F 40/40

USPC .......................................................... 345/619

See application file for complete search history.

(56) References Cited

U.S. PATENT DOCUMENTS

| | | | | |
|---|---|---|---|---|
| 2017/0270079 | A1* | 9/2017 | Rajwat | G06F 40/186 |
| 2022/0215606 | A1* | 7/2022 | Radford | G06F 40/109 |
| 2024/0346709 | A1* | 10/2024 | Orton | G06T 11/00 |
| 2025/0078972 | A1* | 3/2025 | Gormley | G16H 50/20 |

* cited by examiner

*Primary Examiner* — Thomas J Lett

(74) *Attorney, Agent, or Firm* — NovoTechIP International PLLC

(57) ABSTRACT

A data processing system implements receiving, via a user interface of a client device of a user, a first prompt requesting an image to be generated for the user by a generative model, the first prompt including textual content. The system further implements constructing a second prompt by a prompt construction unit as an input to the generative model, the prompt construction unit constructing the second prompt by extracting an artifact and a theme from the textual content and appending the artifact and the theme to an instruction string, the instruction string comprising instructions to the generative model to determine a design template matching the artifact, and to generate the image by replacing visual element(s) of the design template based on the theme while preserving a graphic layout of the design template; providing the image to the client device; and causing the user interface to present the image.

20 Claims, 11 Drawing Sheets

THEMATIC VARIATION GENERATION FOR AI-ASSISTED GRAPHIC DESIGN

BACKGROUND

Artificial intelligence (AI) has the potential to automate our lives to save time and increase productivity. One area of interest is visual content creation, and image generative models have become a popular and powerful tool for creating visual content. However, users of image generative models have complained about lack of control over the outputs, such as output images being different from users' expectations, even when the users provided detailed prompts. It is frustrating and time-consuming for the users to repeatedly generate images before getting satisfactory results. There are technical challenges to provide users more control over AI-powered visual content creation while fully utilizing professionally-crafted designs made by artists or crowd-sourced designs. Hence, there is a need for improved user-control mechanisms over AI-assisted visual content creation systems and methods.

SUMMARY

An example data processing system according to the disclosure includes a processor and a machine-readable medium storing executable instructions. The instructions when executed cause the processor alone or in combination with other processors to perform operations including receiving, via a user interface of a client device of a user, a first prompt requesting an image to be generated for the user by a generative model, the first prompt including textual content; constructing a second prompt by a prompt construction unit as an input to the generative model, the prompt construction unit constructing the second prompt by extracting at least an artifact and a theme from the textual content and appending at least the artifact and the theme to an instruction string, the instruction string comprising instructions to the generative model to determine a design template matching the artifact, and to generate the image by replacing one or more visual elements of the design template based on the theme while preserving a graphic layout of the design template; providing the image to the client device; and causing the user interface to present the image.

An example method implemented in a data processing system includes receiving, via a user interface of a client device of a user, a first prompt requesting an image to be generated for the user by a generative model, the first prompt including textual content; constructing a second prompt by a prompt construction unit as an input to the generative model, the prompt construction unit constructing the second prompt by extracting at least an artifact and a theme from the textual content and appending at least the artifact and the theme to an instruction string, the instruction string comprising instructions to the generative model to determine a design template matching the artifact, and to generate the image by replacing one or more visual elements of the design template based on the theme while preserving a graphic layout of the design template; providing the image to the client device; and causing the user interface to present the image.

An example data processing system according to the disclosure includes a processor and a machine-readable medium storing executable instructions. The instructions when executed cause the processor alone or in combination with other processors to perform operations including receiving, via a user interface of a client device of a user, a first prompt requesting an image to be generated for the user by a generative model, the first prompt including textual content; constructing a second prompt by a prompt construction unit as an input to the generative model, the prompt construction unit constructing the second prompt by extracting at least an artifact and a theme from the textual content and appending at least the artifact and the theme to an instruction string, the instruction string comprising instructions to the generative model to determine a design template matching the artifact, and to generate the image by replacing one or more visual elements of the design template based on the theme while preserving a graphic layout of the design template; providing the image to the client device; and causing the user interface to present the image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
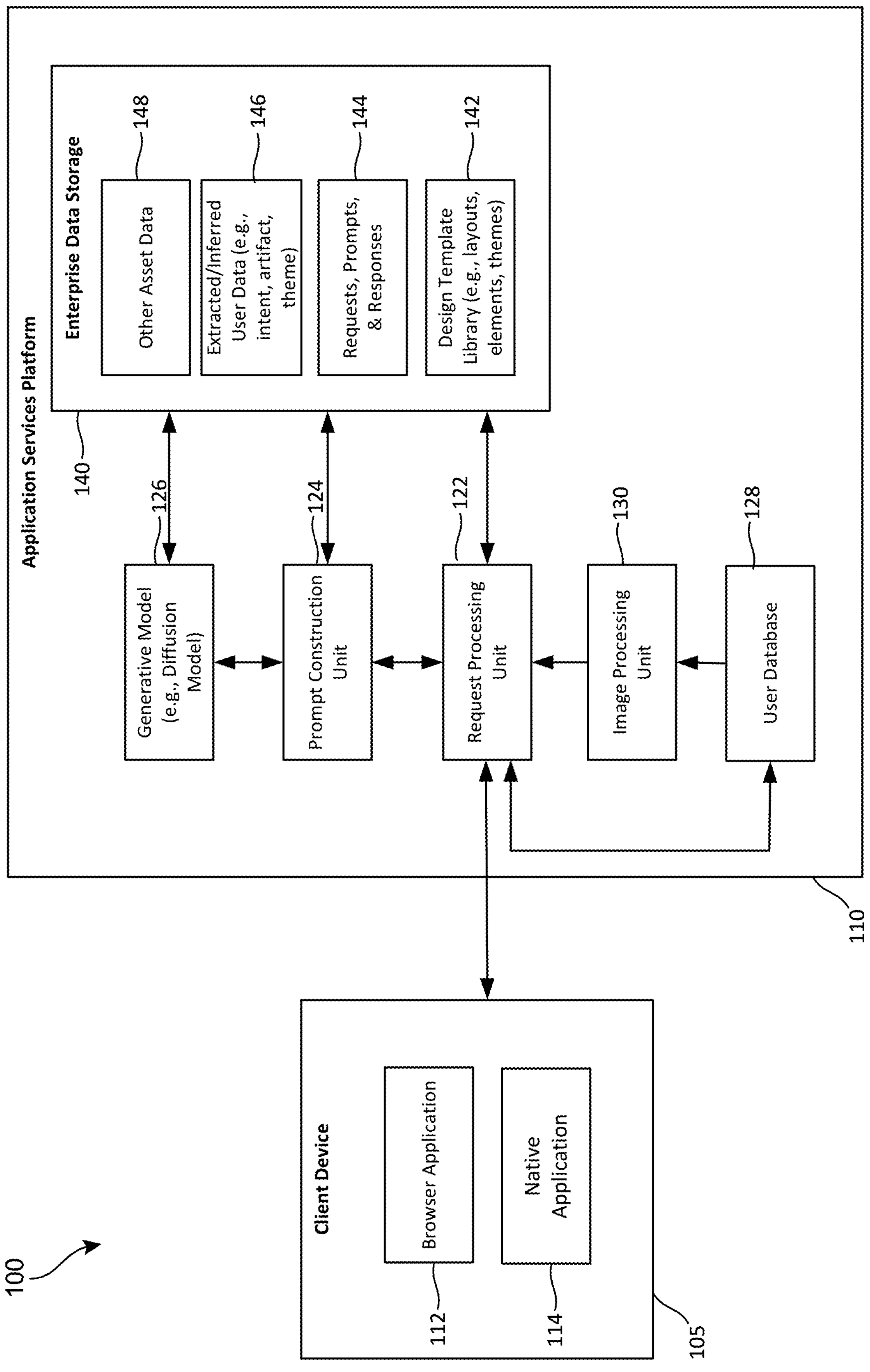
FIG. 1A is a diagram of an example computing environment in which the techniques for providing thematic graphic design variations via a generative model are implemented.

Systems and methods for providing thematic graphic design variations via a generative model are described herein. These techniques provide a technical solution to the technical problem of lack of user control over AI-assisted graphic design outputs. The existing AI-assisted graphic design systems automate many design tasks that were previously done manually, such as image generation, text layout, color selection, and the like. Although these systems help users to work more efficiently and produce more work products, they often generate unexpected images that require the users to repeatedly tweak the user prompts for satisfactory results. This is because the models are trained on large datasets of images to generate images that are statistically similar to the images in the dataset. While, this does lead to generating images consistent with the user's intent, users often have trouble controlling the style and composition of the generated images. For example, a user might prompt an image generative model to generate a birthday party invitation. The user might prompt a model to generate the birthday party invitation with local landscape around the text. Nevertheless, the model instead generates an image of an international landscape, or the landscape might be too bright or too dark, or the layout of the landscape and the text are off-balance. Even when a user provides a detailed prompt, the model may not generate an image that is consistent with the prompt.

To address the issues, the proposed system improves graphic design outputs generated using a generative model by providing users with graphic design templates of thematic variations. By using a graphic design template selected based on a user request artifact, then replacing visual elements of the template with those of a desired theme, users can improve their control over the output of image generative models and generate images that are more consistent with their intent. For instance, the system extracts and/or infers user intent, artifact, and/or theme from user data (e.g., user activity data, user image data, preferences, etc.), as a mechanism to obtain variations of a design template that is customized at runtime to match the intent contextually. The system thus preserves the overall composition of the design template, e.g., the layout and structure, and changes the visual elements to match runtime intent. Besides the layout, the system may preserve color, style, typography, whitespace, texture, scale, or the like of a design template. For example, the system may adopt a brand kit.

In an example, the system provides an improved method for obtaining a selected set of design variations from a generative AI model (e.g., an image generative model working independently or in conjunction with a large language model (LLM)) that preserves an overall composition (e.g., layout) of a design while introducing changes to visual elements of the design (e.g., thematic variations) according to the selected set of design variations. As such, the system offers the user AI-assisted content creation with an improved user experience and with more control in selecting the design that matches the user's intent.

A technical benefit of the approach provided herein is to allow for obtaining the selected set of design variations in a predictable and helpful way that preserves the overall composition of the design. Therefore, the generated visual content more accurately represents the user intent and preferences. Not only does this improve the productivity of the user, but this approach can also decrease the computing resources required to refine the visual content based on refined user queries to the generative model. Another technical benefit of this approach is to provide a design variation pipeline that takes an existing design and a user intent at runtime to produce the selected set of design variations to present to the user, allowing the user to select from among the set to arrive at a designed design. Another technical benefit of this approach is to provide a user experience (UX) related to a thematic variation feature for graphic designs. The system automatically suggests variations of the same theme desired by the user. The automated generation of thematic variations offers more user choices than one simple output, thereby improving the user experience. Moreover, a tangible result in the form of the selected set of design variations is presented to the user with high quality designs and relevancy to the user intent.

Another technical benefit of this approach is storing the image output as a design template in the system thereby saving the user significant time and effort in creating similar visual content in the future. Yet another technical benefit of this approach is that other users can utilize the new template to save time and effort. These and other technical benefits of the techniques disclosed herein will be evident from the discussion of the example implementations that follow.

FIG. 1A is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-assisted visual content creation applications, presentation applications, website authoring applications, collaboration platforms, communications platforms, and/or other types of applications in which users may create, view, and/or modify various types of graphic designs. In the implementation shown in FIG. 1A, the application services platform 110 also applies generative AI to generate fast and satisfactory visual content outputs upon user demand according to the techniques described herein. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1A includes a single client device 105, other implementations may include a different number of client devices that utilize services provided by the application services platform 110.

As used herein, the term "user intent" refers to the final visual content output desired by a user that can be fully or partially described in a user prompt, and supplementally extracted from user data such as historical user prompt data, user emails, user preferences, and the like.

A visual content "theme" is a unifying concept or idea that guides the visual elements of a design project. It helps to convey a specific message or atmosphere and create a cohesive and consistent look and feel for the project. Common elements of a visual content theme include color palette, typography, imagery (e.g., photographs, illustrations, or icons), layout, style (e.g., minimalist, retro, or modern), and the like.

A visual content "layout" is the arrangement of predetermined graphic elements such as image, text and style on a page. The visual content layout establishes the overall appearance and relationships between the graphic elements to achieve a smooth flow of message and eye movement for maximum effectiveness or impact. For example, a grid layout can be used to create a sense of order and balance, while a free-form layout can be used to create a sense of creativity or energy.

Although various embodiments are described with respect to graphic designs (e.g., publication, email marketing templates, PowerPoint presentations, menus, social media ads, banners and graphics, marketing and advertising, packaging, visual identity, art and illustration graphic design, and the like), it is contemplated that the approach described herein may be used with any visual content creation, such as photography, videography, animation, motion graphics, user interface graphic design (e.g., game interface, app design, etc.), event and conference spaces, and the like.

The client device 105 includes a native application 114 and a browser application 112. The native application 114 is a web-enabled native application, in some implementations, which enables users to view, create, and/or modify graphic designs. The web-enabled native application utilizes services provided by the application services platform 110 including but not limited to creating, viewing, and/or modifying various types of graphic designs. The native application 114 implements a user interface 205 shown in FIGS. 2A-2D in some implementations. In other implementations, the browser application 112 is used for accessing and viewing web-based content provided by the application services platform 110. In such implementations, the application services platform 110 implements one or more web applications, such as the browser application 112, that enables users to view, create, and/or modify graphic designs. The browser application 112 implements the user interface 205 shown in FIGS. 2A-2D in some implementations. The application services platform 110 supports both the native application 114 and the browser application 112 in some implementations, and the users may choose which approach best suits their needs.

The application services platform 110 includes a request processing unit 122, a prompt construction unit 124, a generative model 126, a user database 128, an image processing unit 130, an enterprise data storage 140, and moderation services (not shown).

The request processing unit 122 is configured to receive requests from the native application 114 and/or the browser application 112 of the client device 105. The requests may include but are not limited to requests to create, view, and/or modify various types of graphic designs and/or sending prompts to a generative model 126 (e.g., an image generative model) to generate a graphic design according to the techniques provided herein.

In one embodiment, the generative model 126 is an image generative model trained to generate visual content (e.g., image, video, and the like) in response to natural language prompts and/or image(s) input by a user via the native application 114 or via the web. For instance, the generative model 126 may be implemented using a SDXL diffusion model. SDXL (Stable Diffusion XL) is an enhanced version of the Stable Diffusion text-to-image diffusion model that offers several improvements over previous diffusion models. With a larger U-Net backbone, multi-scale conditioning, cross-modal attention, multi-aspect ratio training, and a refinement model, the SDXL diffusion model requires almost no meta prompting. The generative model may be another type of diffusion model or any other type of generative model.

The prompt construction unit 124 can construct a meta prompt based on the user intent and then send the meta prompt to the generative model 126 to generate a graphic design for the user based on an existing design template retrieved from a design template library 142, or based on the design template generated from the user input image. In one embodiment, the generated graphic design is saved in the design template library 142 as a new graphic design template (including the layout, elements, theme of the template).

For example, the prompt construction unit 124 generates the meta prompt in Table 1. The meta prompt can be adapted or extended based on different implementations, such as different generative models.

TABLE 1

```
my_prompt = f"keep the composition of main objects, and alter each to fit
the theme of {keyword}"
negative_prompt = "text"
```

The meta prompt in Table 1 provides context and guidance to the generative model 126, and helps the model improve the quality and consistency of the output. The theme helps the generative model 126 to understand the desired style, tone, and/or format of the output. The meta prompt in Table 1 also includes a negative prompt to steer the generative model 126 away from generating text. It is the opposite of a positive prompt, which is used to guide the model towards generating the specific type of content. In other embodiments, the meta prompt can include a negative prompt to avoid generating a "blurry," "pixelated," "low quality," "violent," or "hateful" image.

In some implementations, the system may select a different text-to-image model, such as DALL-E, Imagen, GauGAN2, VQGAN+CLIP, or the like, based on factors such as open source, photorealistic, creative control, computational requirements, case of use, licensing, and the like. The less sophisticated a text-to-image model, the more meta prompting and/or additional tools/models are required to provide the same quality outputs. For instance, the system can use a simpler diffusion model in conjunction with an object segmentation model to identify the main objects in an original design image and replace them with objects related to the user's requested theme. Such object segmentation can identify the sticker-like elements (e.g., visual elements 154*a*-154*e* in a textless image 160 in FIG. 1B). The system then prompts an image generation model to generate objects related to the user's theme, for example, the simpler diffusion model can be prompted to generate a sticker pack for the requested theme. Then the system uses segmentation model(s) and image processing algorithms to cut out the stickers from the textless image 160 and replaces the stickers with the stickers of the requested theme, as explained in more details below.

In some implementations, the generative model 126 is implemented using the SDXL diffusion model in conjunction with a large language model (LLM) to handle more complex user requests that require natural language processing (NLP) capabilities beyond what is built in the SDXL diffusion model. Examples of LLMs include but are not limited to a Generative Pre-trained Transformer 3 (GPT-3), or GPT-4 model. Other implementations may utilize other models or other generative models to generate a graphic design based on considerations of open source, photorealistic, creative control, computational requirements, case of use, licensing, and the like. In implementations where other models in addition to the generative model 126 are utilized, those models may be included as part of the application services platform 110 or they may be external models that are called by the application services platform 110.

The request processing unit 122 also coordinates communication and exchange of data among components of the application services platform 110 as discussed in the examples which follow. The request processing unit 122 receives a user request to generate a graphic design from the native application 114 or the browser application 112. For example, the user request is a natural language prompt input by the user which is then passed on to the prompt construction unit 124. The natural language prompt requests to generate a graphic design and identify the user submitting the natural language prompt. The natural language prompt may imply or indicate that the user would like to have the graphic design generated by a generative model (e.g., the generative model 126). For example, the user request is expressed in a user prompt: "invitation card for a princess theme birthday party for Anna" or "I want to use AI to generate an invitation card for a princess theme birthday party for Anna."

In one embodiment, once the generative model 126 tokenizes and interprets the user prompt for setting up the particular graphic design, either the generative model 126 or the prompt construction unit 124 can preformulate meta-prompts for querying the user for more birthday party details, such as the birthday date, party address, RSVP deadline, and the like.

In another embodiment, the prompt construction unit 124 can use user data from various user data source(s) to generate birthday party details for generating the invitation graphic design. For instance, user activity data 128*a* (depicted in FIG. 3) can be digitized and stored in the user database 128. The user data source(s) can be online/offline databases (e.g., emails, social media posts, and the like), documents, articles, books, presentation content, and/or other types of content containing user activity information.

In one embodiment, in response to the user prompt, the prompt construction unit 124 can retrieve user activity data 128*a* from the user database 128 based on an indication identifying the user in the user prompt. The indication may be a user identifier (e.g., a username, email address, and the like), and/or other identifier associated with the user that the application services platform 110 can use to identify the user and retrieve user data. The user data can include a user name, a user organization, a user preferred graphic design style (e.g., minimalism, retro, art deco, Memphis design, Swiss style, Bauhaus, pop art, punk, etc.), and the like. As such, when the user does not provide the required information to generate the birthday party invitation, the prompt construction unit 124 may retrieve the missing information from the user activity data 128*a*, instead of asking more questions for the missing information via an AI chat interface.

For structured user activity data (e.g., calendar entries from calendar application(s), entries from task management application(s), and the like), semi-structured user activity data (e.g., emails from email application(s), tweets, and the like), and/or un-structured user activity data (e.g., a blog post, a social media post, and the like), the prompt construction unit 124 can include the data directly in the prompt to the generative model 126.

When the user data is contained in documents, the system can apply document summarization techniques on the documents and then parse natural language and use SQL-type queries to retrieve user activity information. Then, the system can guide graphic design generation using user activity information contained in the documentation. For instance, the prompt construction unit 124 can infer from an email in a personal email application that the user will organize a birthday party for herself on Jan. 4, 2023. At 544 Frisco Avenue. RSVP to her email address Anna@gmail.com.

The prompt construction unit 124 may reformat or otherwise standardize any information to be included in the prompt to a standardized format that is recognized by the generative model 126. The generative model 126 is trained using training data in this standardized format, in some implementations, and utilizing this format for the prompts provided to the generative model 126 may improve the predictions provided by the generative model 126.

In some implementations, when the user data (e.g., user activity data 128*a*, user image data 128*b*, preferences, etc.) from the user database 128 is already in the format directly processible by the generative model 126, the prompt construction unit 124 does not need to convert the user data. In other implementations, when the user data is not in the format directly processible by the generative model 126, the prompt construction unit 124 converts the user data to the format directly processible by the generative model 126. Some common standardized formats recognized by a language model include plain text, HTML, JSON, XML, and the like. In one embodiment, the system converts user data into JSON, which is a lightweight and efficient data-interchange format. In addition, ChatML document format is used to provide document context information to ChatGPT, and ChatML may be used which is a JSON-based format that allows a user to specify the conversational history, dialog state, and other contextual information.

The application services platform 110 complies with privacy guidelines and regulations that apply to the usage of the user data included in the user database 128 to ensure that users have control over how the application services platform 110 utilizes their data.

In some implementations, the user provides an image with the user prompt as an input to the generative model 126. The image is intended by the user to be used as a design template, and the system saves the image as the user input image data 128*b* in the user database 128. For instance, the image is in a format of JPEG (Joint Photographic Experts Group), PNG (Portable Network Graphics, TIFF (Tagged Image File Format), BMP (Bitmap Image File), GIF (Graphics Interchange Format), PSD (Photoshop Document), RAW, SVG (Scalable Vector Graphics), WEBP, OpenEXR, or the like.

Figure 4:
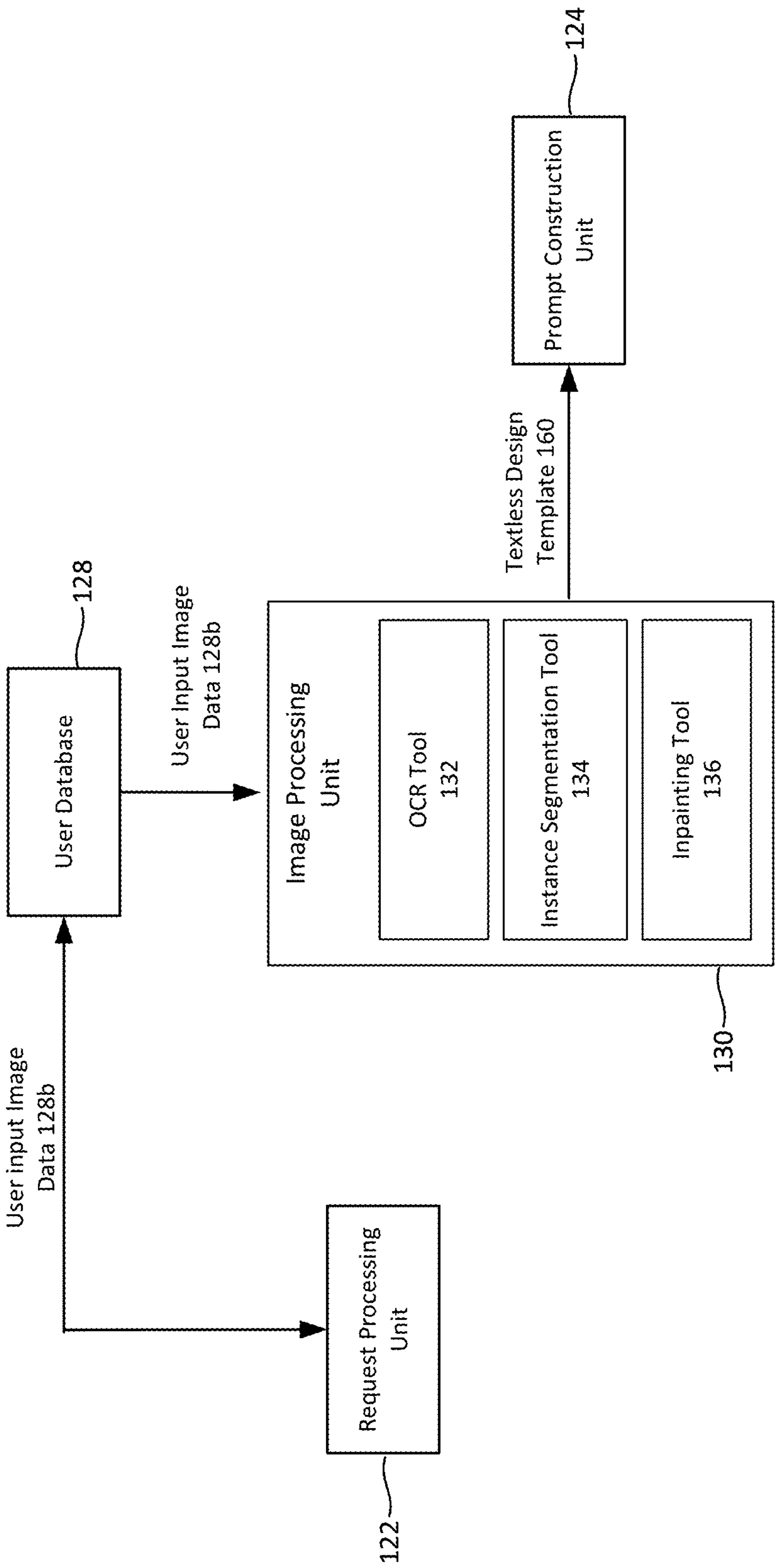
FIG. 4 is a diagram showing additional features of an image segmentation unit of the application services platform shown in FIG. 1A.

In some implementations, the image processing unit 130 can identify text element(s) within the user input image using an optical character recognition (OCR) tool 132 (depicted in FIG. 4), removes the text element(s) from the user input image to provide a textless image, and generates a mask image with mask box(es) corresponding to the text element area(s). The generative model 126 (e.g., the SDXL diffusion model) then applies the instance segmentation tool 134 (depicted in FIG. 4) to identify one or more visual elements in un-masked areas defined based on the mask image and the textless image, and replaces the one or more visual elements with one or more corresponding thematic variations in the textless image using the inpainting tool 136 (depicted in FIG. 4). Additional details of the image processing unit 130 are shown in FIG. 4, which is described in detail in the examples which follow. The resulted design can be used as a design template for the future.

Figure 1B:
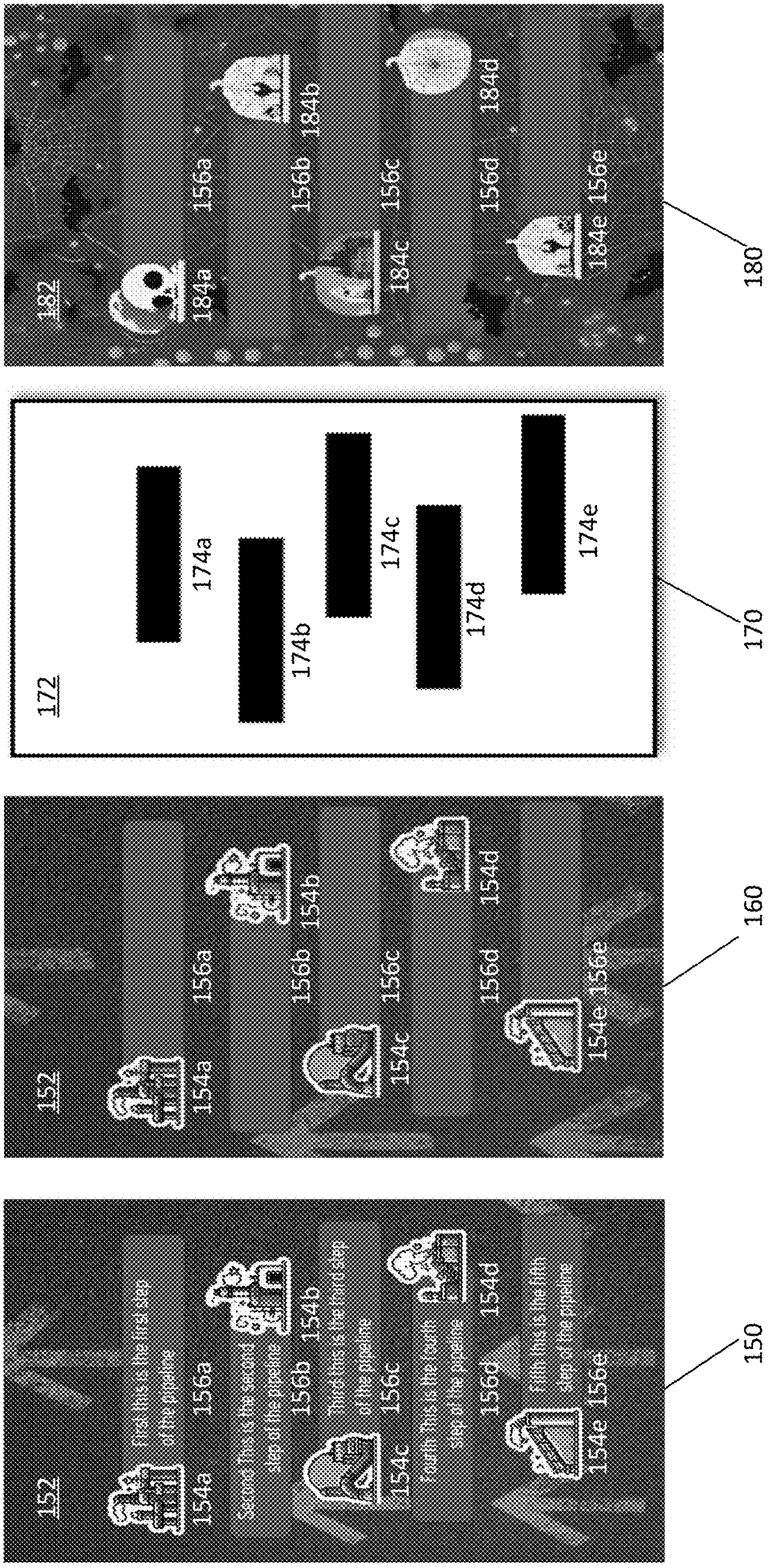
FIG. 1B depicts a design variation workflow of the system of FIG. 1A according to principles described herein.

FIG. 1B depicts a design variation workflow of the system of FIG. 1A according to principles described herein. As shown in FIG. 1B, the design variation workflow begins with a design input 150 (e.g., a user input image 150, a raw image used by the system, or the like). The design input 150 can come either from the system to generate a design template to enrich the design template library 142, or from the user in connection with a user prompt to use as a design template for a desired output. The design input 150 will be converted into a design template 180 to be used by the generative model 126. The system can then add text extracted from the user prompt and/or text inferred form the user data into the design template 180. In this example, the design input 150 includes a background 152 (depicting upwards pointing arrows), five visual elements 154*a*-154*e* (depicting various factory facilities), and five textual boxes 156*a*-156*e* (depicting various text elements).

The text elements (e.g., First: this is the first step of the pipeline Second: this is the second step of the pipeline Third . . . ) in the design input 150 are identified and recognized using the OCR tool 132. Then, the instance segmentation tool 134 erases the text element(s) from the design input 150, which includes inpainting. Text attributes are noted for the text elements to be removed or erased from the design input 150. The result is shown in the textless image 160. The text attributes, for example, in a JSON format, can be communicated with the textless image 160 and saved to the design template library 142.

In addition, the system recognizes mask boxes 174*a*-174*e* corresponding to the text elements in the design input 150 over a blank background 172 to generate a mask image 170. The system then feeds the textless image 160 and the mask image 170 into the generative model 126 (e.g., the SDXL diffusion model) to replace the visual elements 154*a*-154*e* with thematic/Halloween variations 184*a*-184*e*, to replace the upwards pointing arrows of the background 152 with a Halloween theme background 182, based on a user input theme (e.g., Halloween). For instance, the generative model 126 can use the inpainting tool (e.g., inpainting in the SDXL diffusion model) to accomplish the replacement into the thematic variations 184*a*-184*c* and the Halloween theme background 182.

In one embodiment, when the design input 150 is already in the format directly processible by the generative model 126, the prompt construction unit 124 does not need to convert the resulting design template. In another embodiment, when the design input 150 is not in the format directly processible by the generative model 126, the prompt construction unit 124 converts the design input 150 to the format directly processible by the generative model 126. Common image data formats stored in an image generative model include vector representation, tensors, latent spaces/representations, activation maps, feature maps, raw pixel values, parameters of neural network(s), and the like. The choice of an image data format is crucial for optimizing performance, memory efficiency, and the overall effectiveness of the generative model 126.

As described, the generative model 126 adds the thematic variations 184*a*-184*e* and the Halloween theme background 182 to the textless image 160, to generate the resulting design template 180. The generative model 126 can then add appropriate text to text boxes 156*a*-156*e* in the design template 180 as the final output for the user. Either the prompt construction unit 124 or a language model can generate the appropriate text (e.g., "Anna's birthday party at 544 Frisco Avenue. RSVP at Anna@gmail.com") based on the user prompt (e.g., "invitation for a princess theme birthday party for Anna on Jan. 4, 2023. At 544 Frisco Avenue. RSVP".

In one embodiment, metadata can be generated for the design template 180 to facilitate later retrieval based on a user query. For example, the metadata might detail that the design template 180 is related to a birthday party event. Consequently, any user query related to a birthday party can be matched to the design template 180 using the design metadata.

Given an existing design template, and a user intent at runtime, the workflow can accurately vary the content of the design template, while honoring the graphic layout of the design template. With these feature, the system unlocks the possibility for expanding templates with complex layouts to a virtually infinite set of thematic variations matching user intents. Since the design templates produced by this workflow are editable, the system can offer users more control in navigating through their AI-generated content (AIGC) experiences.

In some implementations, the user may submit further prompts requesting additional graphic design(s) to be generated and/or to further refine the graphic design that has already been generated. The request processing unit 122 can store the design element data included in the meta prompt in some implementations for the duration of a user session in which the user uses the native application 114 or the browser application 112. A technical benefit of this approach is that the design element data do not need to be retrieved each time that the user submits a natural language prompt to generate a graphic design. The request processing unit 122 maintains user session information in a persistent memory of the application services platform 110 and retrieves the design element data from the user session information in response to each subsequent prompt submitted by the user. The request processing unit 122 then provides the newly received user prompt and the design element data to the prompt construction unit 124 to construct the prompt as discussed in the preceding examples.

All the above-discussed design template library 142 (storing e.g., layouts, elements, themes of templates), request, prompts and responses 144, extracted/inferred user data 146 (e.g., intent, artifact, theme), and other asset data 148 can be stored in the enterprise data storage 140. The extracted/inferred user data 146 (e.g., intent, artifact, theme) is tentatively linked with a user ID during a user graphic design session and saved in a cache. After the user graphic design session, extracted/inferred user data 146 is de-linked form the user ID as metadata of the resulted new design template and saved with the resulted new design template in the design template library 142. In addition, the extracted/inferred user data 146 linked with the user ID is saved back to the user database 128.

The enterprise data storage 140 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

FIGS. 2A-2D are diagrams of an example user interface of an AI-assisted graphic design thematic variation application that implements the techniques described herein. The example user interface shown in FIGS. 2A-2D is a user interface of an AI-assisted graphic design thematic variation application, such as but not limited to Microsoft Designer®. However, the techniques herein for providing thematic graphic design variations via a generative model are not limited to use for AI-assisted graphic design and may be used to generate visual content for other types of applications including but not limited to presentation applications, website authoring applications, collaboration platforms, communications platforms, and/or other types of applications in which users create, view, and/or modify various types of visual content. Such applications can be a standalone application, or a plug-in of any application on the client device 105, such as the browser application 112, the native application 114, and the like. For example, the system can work on the web or within a virtual meeting and collaboration application (e.g., Microsoft Teams®) or an email application (e.g., Outlook®). The system can be integrated into the Microsoft Viva® platform or could work within a browser (e.g., Windows® Edge®). The system can also work within a social media website/application (e.g., Facebook®, Instagram®).

Figure 2A:
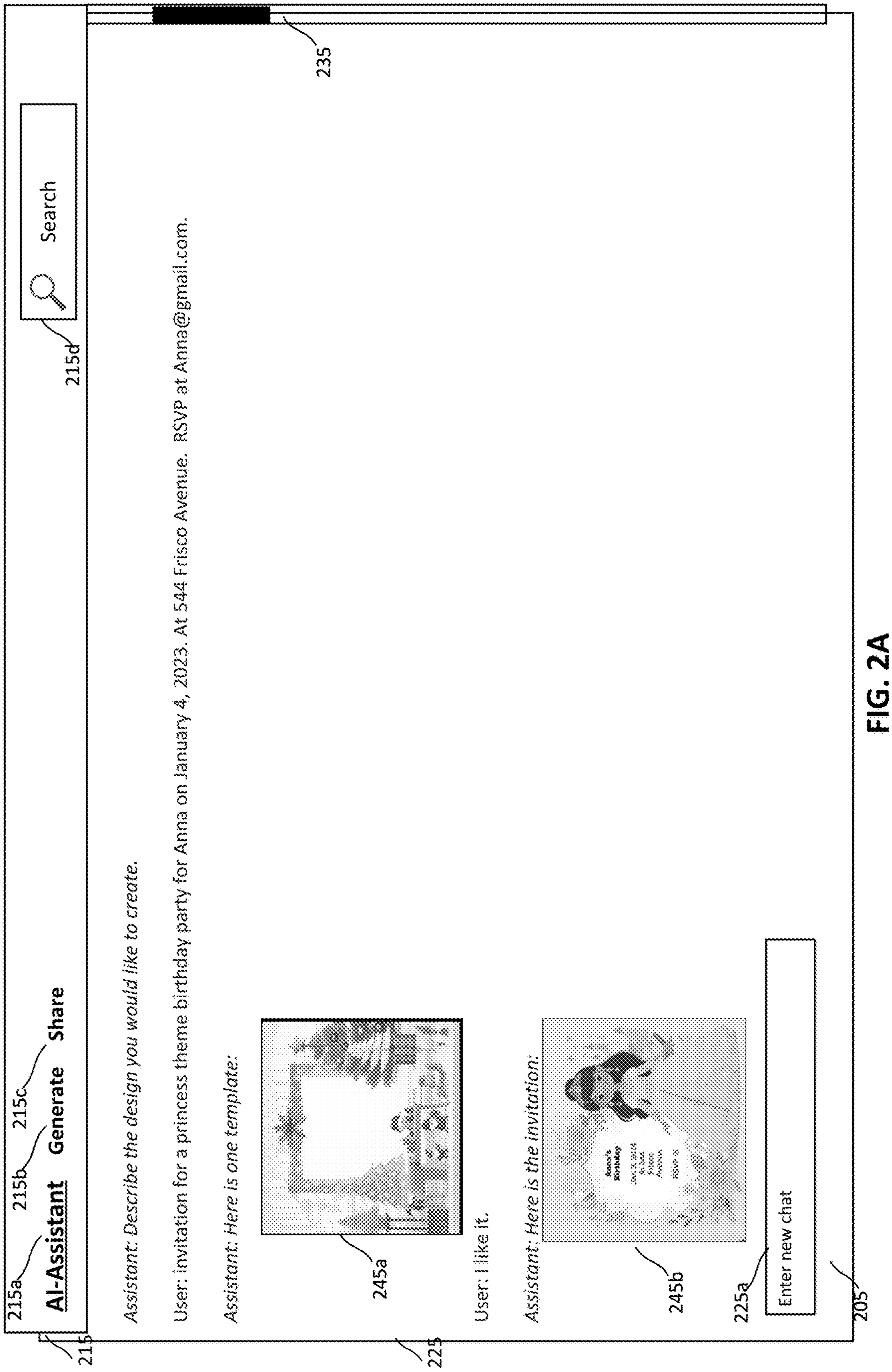
FIGS. 2A-2D are diagrams of example user interfaces of an AI-assisted graphic design thematic variation application that implements the techniques described herein.

FIG. 2A shows an example of the user interface 205 of an AI-assisted graphic design thematic variation application in which the user is interacting with an AI generative model to generate a graphic design. The user interface 205 includes a control pane 215, a chat pane 225 and a scrollbar 235. The user interface 205 may be implemented by the native application 114 and/or the browser application 112.

In some implementations, the control pane 215 includes an Assistant tab 215*a*, a Generate tab 215*b*, a Share tab 215*c*, and a search field 215*d*. The AI-Assistant tab 215*a* can be selected to provide graphic design planning assistant functions as later discussed. In some implementations, the chat pane 225 provides a workspace in which the user can enter prompts in the thematic variation generation application for AI-assisted graphic design. The chat pane 225 also includes a new prompt enter box 225*a* for enabling the user to enter a natural language prompt. In the example shown in FIG. 2A, the chat pane 225 has three Assistant prompts and two user prompts to generate a graphic design. The first Assistant prompt "Describe the design you would like to create" was generated by the generative model 126.

User prompts usually describe content that the user would like to have automatically generated by the generative model 126 of the application services platform 110. The application submits the natural language prompt to the application services platform 110 and user information identifying the user of the application to the application services platform 110. The application services platform 110 processes the request according to the techniques provided herein to generate a graphic design according to the user prompt.

In this example, in response to the user prompt "invitation for a princess theme birthday party for Anna on Jan. 4, 2023. At 544 Frisco Avenue. RSVP at Anna@gmail.com," the second Assistant prompt includes an invitation template 245*a* with a statement: "Here is one template." The second user prompt states "I like it." The third Assistant prompt includes a graphic design output 245*b* with a statement: "Here is the invitation." The graphic design output 245*b* depicts a princess-theme birthday party invitation with address and RSVP details.

The Generate tab 215*b* can be selected to generate graphic design output corresponding to the user prompt. The Share tab 215*c* can be selected to trigger a dropdown list of applications to share the graphic design output 245*b*. For example, the user can post the graphic design output 245*b* on a social media application (e.g., Facebook®) to promote a birthday party. The search field 215*d* is for a user to enter a search word, phrase, paragraph, and the like within the design template library 142, the requests, prompts, and responses 144, the extracted/inferred user data 146 (e.g., intent, artifact, theme), the other asset data 148, and the like. The fields in the thematic variation generation application for AI-assisted graphic design can provide auto-fill and/or spell-check functions.

In some implementations, the "Describe the design you would like to create" prompt is automatically presented on the user interface 205 when the user requests to generate a new graphic design, and/or accesses the thematic variation generation application for AI-assisted graphic design. Alternatively, the "Describe the design you would like to create" prompt may be displayed in response to a user input, such as a keystroke combination or in response to the user activating a menu item or other user interface element on the user interface 205.

Figure 2B:
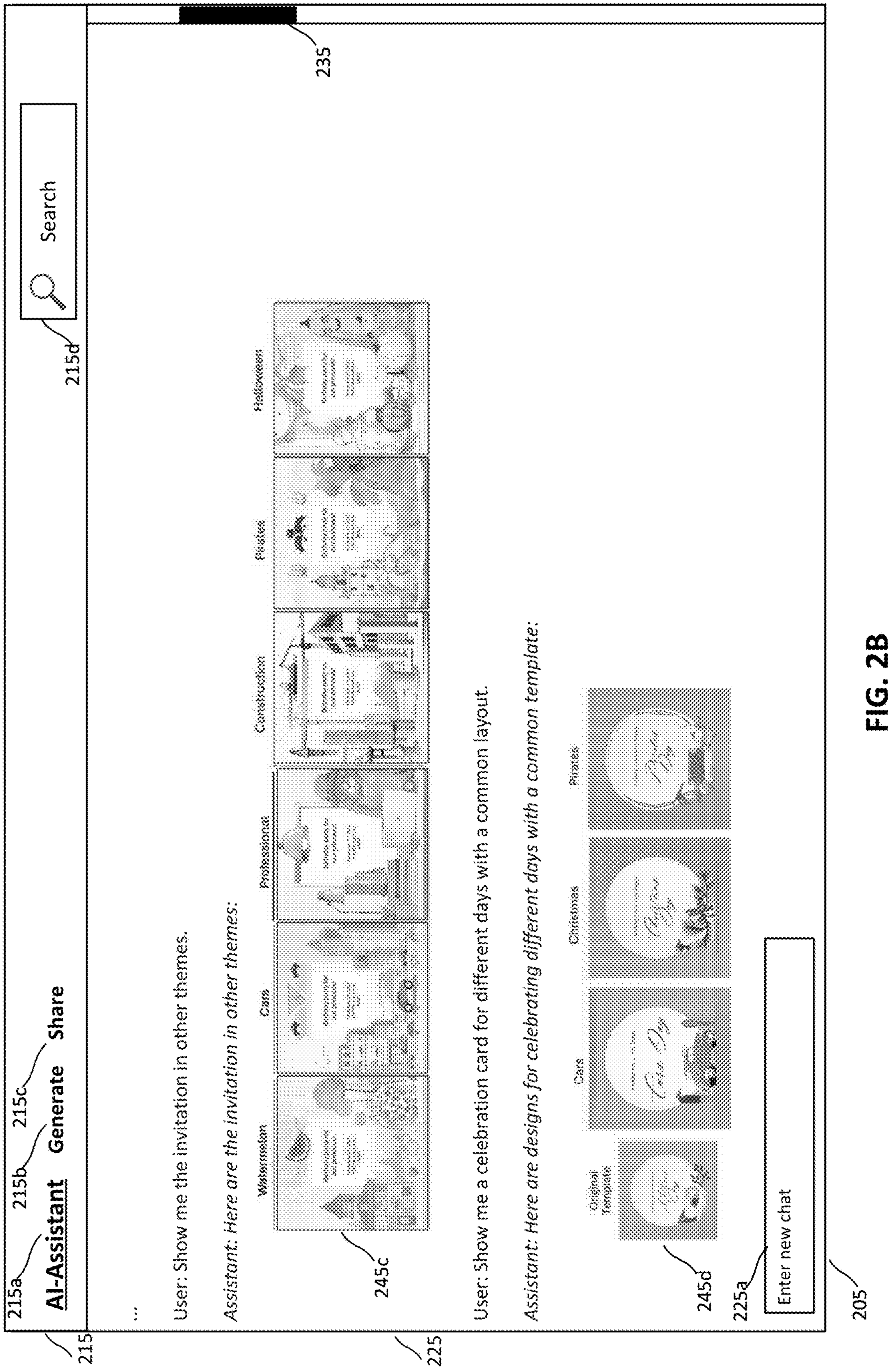

FIG. 2B shows the chat continuing from FIG. 2A with two user requests and two Assistant responses on the user interface 205. In this example, in response to the user prompt "Show me the invitation in other themes," another Assistant prompt includes six invitation designs 245*c* of various themes (i.e., watermelon, car, professional, construction, pirates, Halloween) and a statement: "Here are the invitation in other themes." Yet another user prompt states, "Show me a celebration card for different days with a common layout." The next Assistant prompt includes a graphic design output 245*d* with a statement: "Here are designs for celebrating different days with a common template." The graphic design output 245*d* depicts four cards celebrating Mother's day, cars day, Christmas day, and pirates day.

Figure 2C:
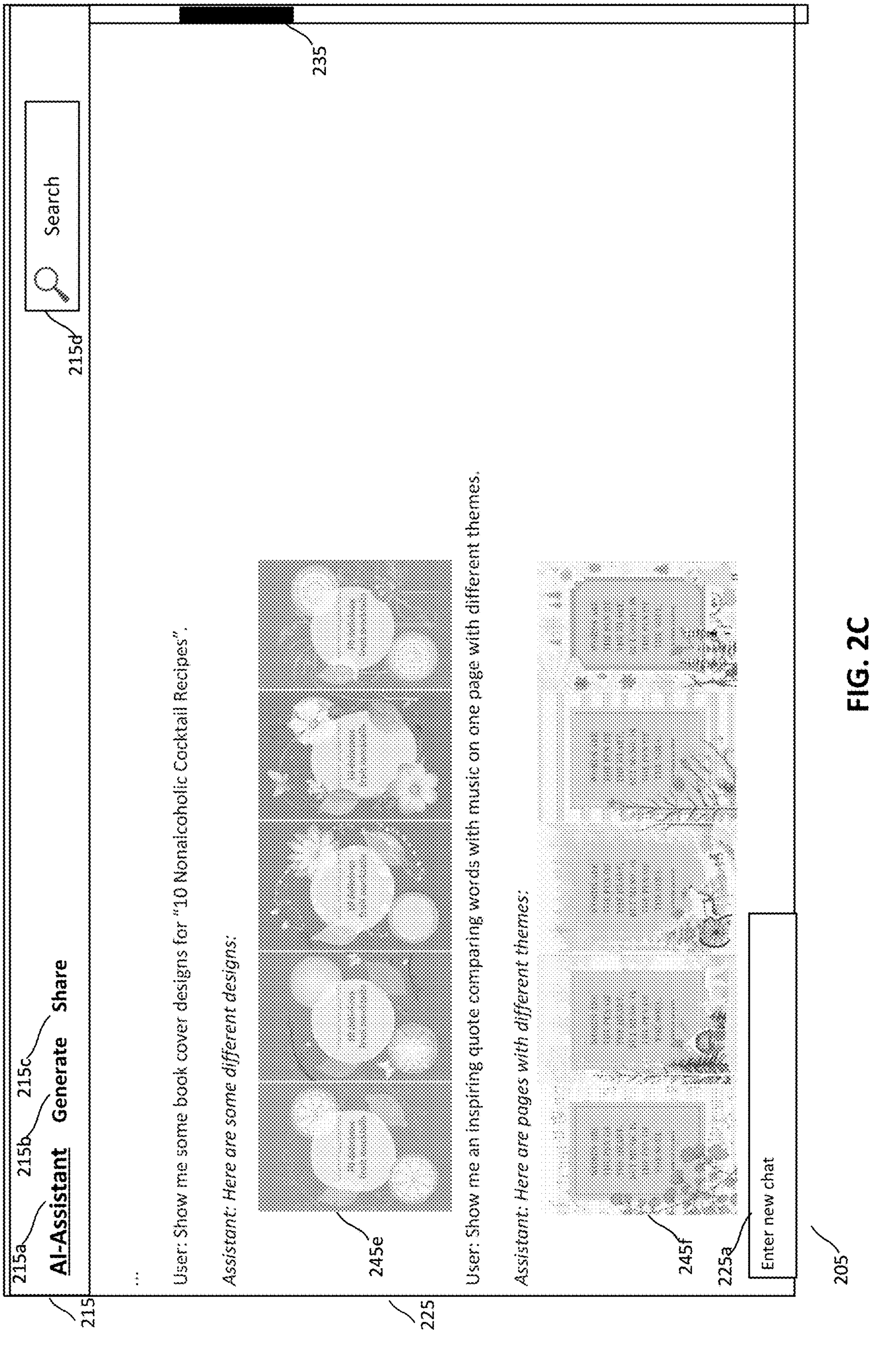

FIG. 2C shows the chat continuing from FIG. 2B with two user requests and two Assistant responses on the user interface 205. In this example, in response to the user prompt "Show me some book cover designs for "10 Nonalcoholic Cocktail Recipes"," another Assistant prompt includes five book cover designs 245*e* of various designs and a statement: "Here are some different designs." Yet another user prompt states, "Show me an inspiring quote comparing words with music on one page with different themes." The next Assistant prompt includes a graphic design output 245*f* with a statement: "Here are pages with different themes." The graphic design output 245*f* depicts five pages of different themes around a quote: "Words are the pen of the heart, but music is the pen of the soul.—Shneur Zalman."

Figure 2D:
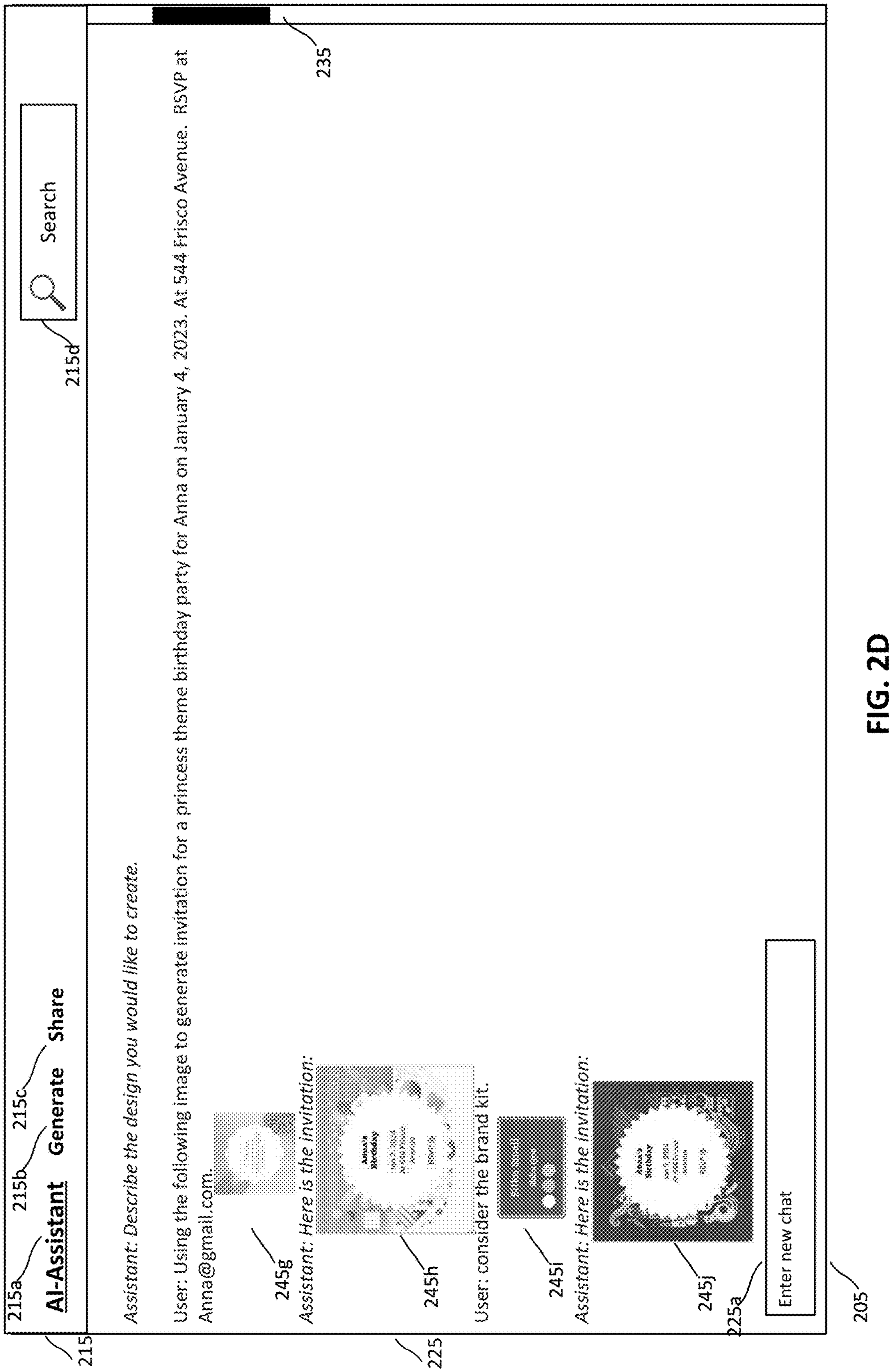

FIG. 2D shows a new chat starting with an Assistant prompt "Describe the design you would like to create," then followed with two user requests and two Assistant responses on the user interface 205. In this example, in response to the user prompt including a statement "Using the following image to generate invitation for a princess theme birthday party for Anna on Jan. 4, 2023. At 544 Frisco Avenue. RSVP at Anna@gmail.com" and a user input image 245*g*, another Assistant prompt includes a graphic design output 245*h* and a statement: "Here is the invitation." The graphic design output 245*h* depicts a birthday invitation sharing the design template of the user input image 245*g*.

Yet another user prompt states "Consider the brand kit" with another user input image 245*i* depicting the brand kit. The next Assistant prompt includes a graphic design output 245*j* with a statement: "Here is the invitation." The graphic design output 245*j* is the output of adopting graphic design output 245*h* to the brand kit. A brand kit is a set of guidelines and assets that define how a brand should be represented visually. For instance, the guidelines specify different sizes, colors, and weights of text, and/or using different types of elements, such as images, lines, and shapes.

In some implementations, the system provides a feedback loop by augmenting thumbs up and thumbs down buttons for each graphic design output in the user interface 205. If the user dislikes a graphic design output, the system can ask why and use the user feedback data to improve the generative model 126. A thumbs down click could also prompt the user to indicate whether the graphic design output was too bright, too dark, too big, too small, or was assigned the wrong theme, or the like.

Figure 3:
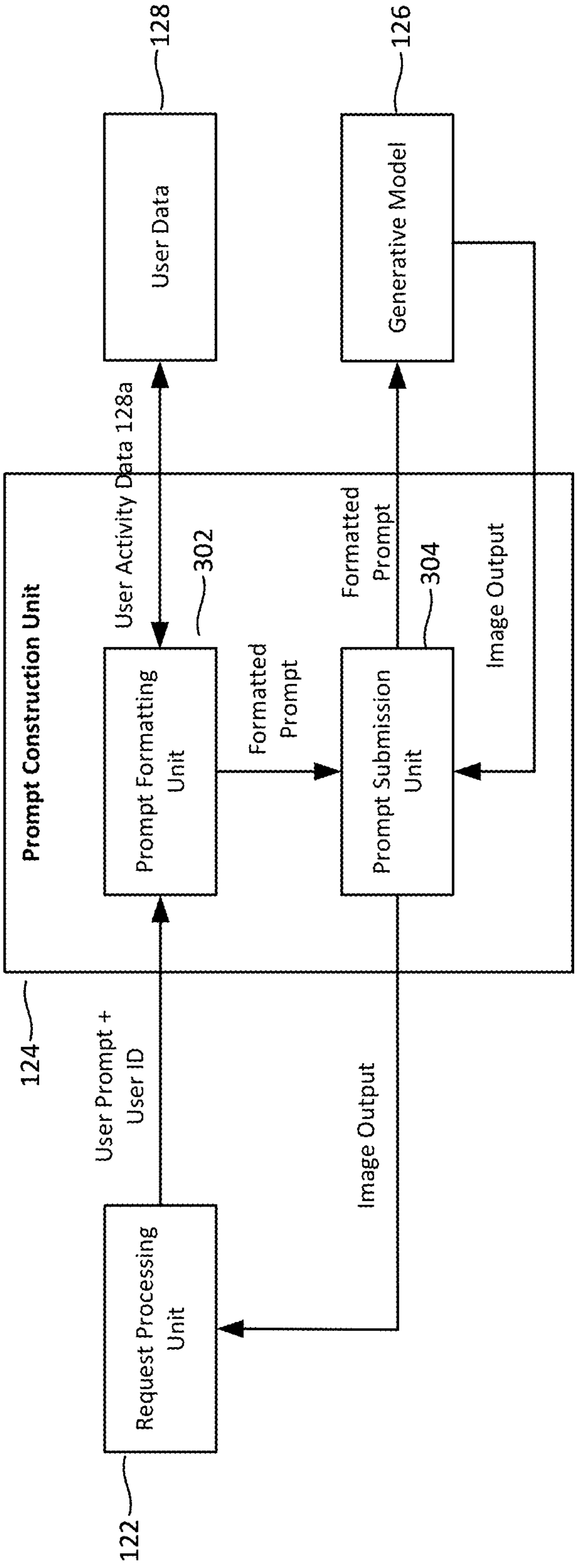
FIG. 3 is a diagram showing additional features of a prompt construction unit of the application services platform shown in FIG. 1A.

FIG. 3 is a diagram showing additional features of the prompt construction unit 124 of the application services platform shown in FIG. 1A. The prompt construction unit formats and submits the prompt for the generative model 126. The prompt construction unit 124 includes a prompt formatting unit 302 and a prompt submission unit 304.

The prompt formatting unit 302 receives a natural language prompt input by the user, and optionally an user input image (e.g., the user input image 245*g* in FIG. 2D) to generate a meta prompt for the generative model 126. The prompt formatting unit 302 formats the meta prompt according to a prompt template and includes the user prompt and optionally the user input image in the meta prompt. A meta prompt template (e.g., the meta prompt in Table 1) can include instructions that guide the generative model 126 to generate a graphic design output. The system can instruct the generative model 126 to generate a single-shot prompt (i.e., including a single example or instruction to guide the language model's response) or a multi-shot prompt (i.e., including multiple examples or instructions to give the model more context and improve its understanding of the task) to query the user for generating the graphic design output.

As mentioned, the prompt construction unit 124 can convert the user data (e.g., user activity data 128*a*, user image data 128*b*, preferences, etc.) to a format directly processible by the generative model 126.

Other implementations may include instructions in addition to and/or instead of one or more of these instructions. Furthermore, the specific format of the prompt may differ in other implementations.

In some implementations, the application services platform 110 includes moderation services that analyze user prompt(s), content generated by the generative model 126, and/or the user data obtained from the user database 128, to ensure that potentially objectionable or offensive content is not generated or utilized by the application services platform 110.

If potentially objectionable or offensive content is detected in the user data obtained from the user database 128, the moderation services provides a blocked content notification to the client device 105 indicating that the prompt(s), the user data is blocked from forming the meta prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model 126 as an input.

In one embodiment, the prompt submission unit 304 submits the user prompt(s), and/or the meta prompt to the moderation services to ensure that the prompt does not include any potentially objectionable or offensive content. The prompt formatting unit 302 halts the processing of the user prompt(s), and/or the meta prompt in response to the moderation services determining that the user prompt(s) and/or the graphic design data includes potentially objectionable or offensive content. FIG. 4 is a diagram showing additional features of the image processing unit 130 of the application services platform shown in FIG. 1A. The image processing unit 130 includes the OCR tool 132, the instance segmentation tool 134, and the inpainting tool 136. The image processing unit 130 can access the user database 128 for the user input image data 128*b* for pre-processing, such as identifying and removing textual elements, extracting a new design template, and the like.

In some implementations, the OCR tool 132 is used on the user input image to extract text element(s). If the user input image includes text, the OCR tool 132 can identify that text element(s) and store the text element(s) in editable characters for potential use. Next, text mask(s) is formed to cover areas of the text element(s) in the user input image to provide a textless image. This is done by identifying each text area(s) as an object in the textless image using the instance segmentation tool 134. Then, the instance segmentation tool 134 segments the text mask(s) from the image background or other graphic elements to provide a mask image. Also, the inpainting tool 136 can fill text-missing area(s) with similar match appearance and texture as neighboring areas in the textless image.

The instance segmentation tool 134 can include one type of machine learning model designed to segment or separate different objects or elements within an input data stream, typically in the context of computer vision tasks, within an image or graphic design. The primary goal of this model is to identify and delineate distinct regions or segments within an image or video, such as identifying and outlining individual objects, people, or specific areas of interest.

For instance, the instance segmentation tool 134 operates essentially as a sophisticated pattern recognition system. The instance segmentation tool 134 takes an input image or video frame and processes it through a neural network architecture, often based on deep learning techniques. The model's initial layers extract low-level features like edges, colors, and textures, gradually moving to higher-level features that represent more complex shapes and patterns. As the input data passes through the network, the model learns to recognize and differentiate between various objects or elements based on these features. It does this by adjusting the weights and biases of its neurons during training, optimizing its ability to make accurate segmentations. Thus, an instance segmentation tool 134 is useful for its ability to adapt and generalize across different types of objects and scenes. Unlike traditional computer vision methods that may require handcrafted rules or templates for specific tasks, instance segmentation tools can learn to segment a wide range of objects and scenes from diverse data sources. This adaptability is achieved through extensive training on large datasets, allowing the model to discover meaningful patterns and relationships on its own. Once trained, the instance segmentation tool can be applied to new images or video frames to automatically segment the objects or elements of interest. This segmentation can have various applications, such as object recognition, image editing, autonomous driving, and more, where the ability to separate and understand different components within visual data is crucial.

In short, in the present system, the instance segmentation tool 134 is used to identify the text mask(s) based on the output of the OCR tool 132. The text mask(s) comprises the pixels in the image that constitute the text element(s). Once the text mask(s) is identified, it is removed from the user input image.

As mentioned, the textless image/design from which the text mask(s) was extracted is input to the inpainting tool 136 to fill in the pixels of the extracted text mask(s). Inpainting is a computer vision and image processing technique used to fill in or replace missing or damaged parts of an image with plausible content, making the imperfections visually seamless and coherent within the context of the surrounding image. This process is often used for tasks like restoring old or damaged photographs, removing unwanted objects or blemishes, and completing images where certain areas are obscured or missing.

The underlying principle of inpainting is to use the information available in the surrounding regions of the missing or damaged area to estimate and generate the missing content. It typically involves two main steps: feature extraction and content generation. In feature extraction, the tool or algorithm analyzes the image to understand its structure, texture, and color patterns. The tool identifies relevant features and patterns in the vicinity of the missing area, in this case, where the text mask was extracted. The features and patterns identified include edges, textures, and gradients, which are crucial for maintaining the visual consistency of the in-painted region. Once the relevant features are extracted, the inpainting tool performs content generation for the missing content by predicting what should be present in the damaged or missing region based on the information from nearby areas. This prediction can be done using various techniques, including texture synthesis, patch-based methods, or deep learning approaches like convolutional neural networks (CNNs). For instance, in deep learning-based inpainting methods, a trained neural network is used to generate the missing content. The network learns to understand the context and relationships between different parts of the image during training, enabling it to generate realistic replacements for the damaged or missing regions. The network's architecture and loss functions are designed to encourage smooth transitions and consistency between the in-painted area and the surrounding regions.

Once inpainting is completed, the result is a design template without any text (e.g., the textless image 160 in FIG. 1B). As noted above, the text element(s) directly from the user input image (e.g., the design input 150 in FIG. 1B) may include typographical errors and/or objectionable content. In one embodiment, the textless image is added to the design template library 142 with metadata such as the text area position data, theme, artifact, and the like, as a new design template.

The generative model 126 can then replace the visual elements in un-masked areas of the textless image with thematic variation(s) while keeping the layout of the user input image, to provide another new design template with thematic variation(s) (e.g., the design template 180 in FIG. 1B). The design template with thematic variation(s) can also be added to the design template library 142 with metadata such as the text area position data, theme, artifact, and the like, as a new design template.

In some implementations, the generative model 126 has the capabilities of at least one of the OCR tool 132, the instance segmentation tool 134, or the inpainting tool 136, and performs the respective functions accordingly. For instance, the generative model 126 (1) segments the text areas for preparing a design template (e.g., the textless image 160 in FIG. 1B), and then (2) segments the main objects in the user input image and replace them with thematically varied objects based on the user requested theme for preparing another textless deign template (e.g., the design template 180 in FIG. 1B). As another instance, the generative model in-paints (1) the textless area(s) for preparing a design template (e.g., a design template 245*a* in FIG. 2A), (2) the contours of the new text and the thematic variations of the visual elements for preparing the graphic design output (e.g., the graphic design output 245*b* in FIG. 2A).

With the original text removed, the system can regenerate new text based on the user prompt, without the typographical errors and/or objectionable content, then provide the graphic design output to the client device 105.

The user database 128 can be implemented on the application services platform 110 in some implementations. In other implementations, at least a portion of the user database 128 are implemented on an external server that is accessible by the prompt construction unit 124.

As mentioned, the application services platform 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the generative model 126 to generate content according to the user intent. In some implementations, the first time that an application, such as the native application 114 or the browser application 112 presents a graphic design assistant to the user, the user is presented with a message that indicates that the user may opt into allowing the application services platform 110 to access user data included in the user database 128 to support the graphic design assistant functionality. The user may opt into allowing the application services platform 110 to access all or a subset of user data included in the user database 128. Furthermore, the user may modify their opt-in status at any time by accessing their user data and selectively opting into or opting out of allowing the application services platform 110 from accessing and utilizing user data from the user database 128 as a whole or individually.

Figure 5:
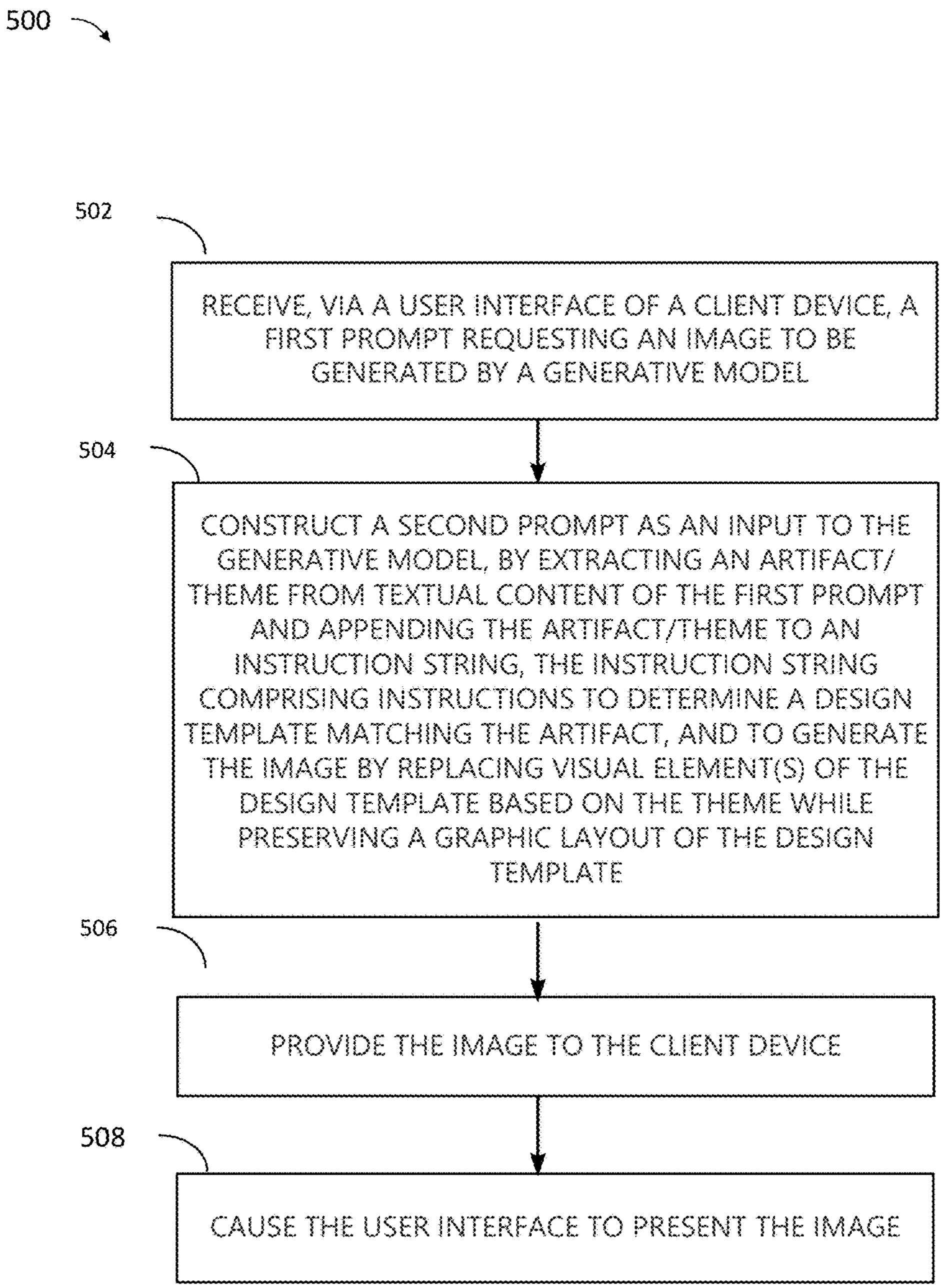
FIG. 5 is a flow chart of an example process for providing thematic graphic design variations via a generative model according to the techniques disclosed herein.
Figure 7:
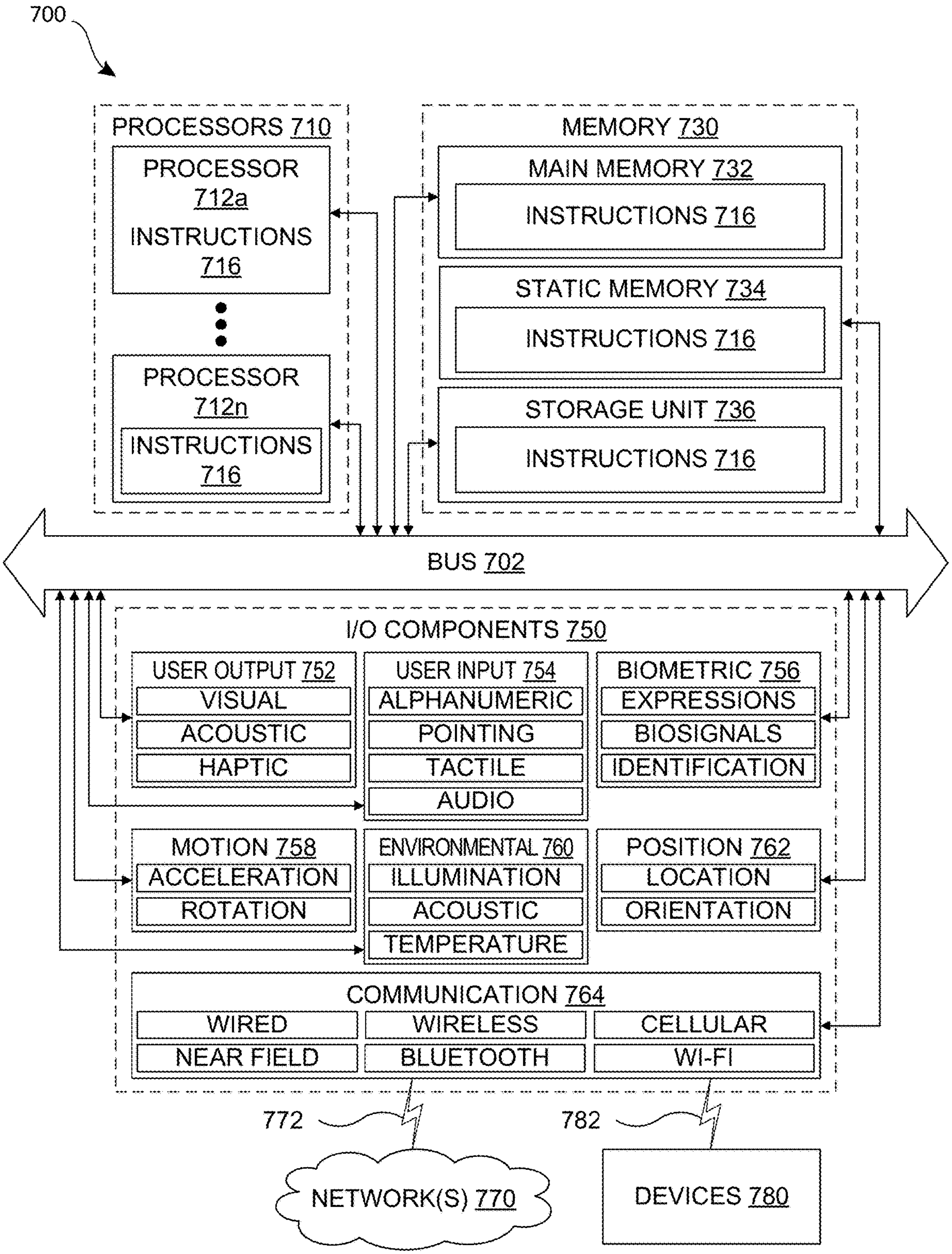
FIG. 7 is a block diagram showing components of an example machine configured to read instructions from a machine-readable medium and perform any of the features described herein.

FIG. 5 is a flow chart of an example process 500 for providing thematic graphic design variations via a generative model according to the techniques disclosed herein. The process 500 can be implemented by the application services platform 110 or its components shown in the preceding examples. The process 500 may be implemented in, for instance, the example machine including a processor and a memory as shown in FIG. 7. As such, the application services platform 110 can provide means for accomplishing various parts of the process 500, as well as means for accomplishing embodiments of other processes described herein in conjunction with other components of the example computing environment 100. Although the process 500 is illustrated and described as a sequence of steps, it is contemplated that various embodiments of the process 500 may be performed in any order or combination and need not include all the illustrated steps.

In one embodiment, for example, in step 502, the request processing module 122 receives, via a user interface (e.g., the user interface 205) of a client device (e.g., the client device 105) of a user, a first prompt (e.g., a user prompt in FIG. 2A) requesting an image to be generated for the user by a generative model (e.g., the generative model 126), the first prompt including textual content.

In step 504, a prompt construction unit (e.g., the prompt construction unit 124) constructs a second prompt (e.g., the meta prompt in Table 1) as an input to the generative model (e.g., the generative model 126), the prompt construction unit constructing the second prompt by extracting at least an artifact (e.g., an invitation) and a theme (e.g., a princess theme) from the textual content (e.g., "invitation for a princess theme birthday party for Anna on Jan. 3, 2023. At 544 Frisco Avenue. RSVP at Anna@gmail.com") and appending at least the artifact and the theme to an instruction string, the instruction string comprising instructions to the generative model to determine a design template (e.g., the design template 245_a_ in FIG. 2A) matching the artifact (e.g., an invitation), and to generate the image (e.g., the graphic design output 245_b_ in FIG. 2A) by replacing one or more visual elements of the design template based on the theme (e.g., a princess theme) while preserving a graphic layout of the design template. Besides the graphic layout, the system may preserve color, style, typography, whitespace, texture, scale, or the like of a design template. For example, the system may adopt a brand kit. In one embodiment, the prompt construction unit includes a language model (e.g., LLM), and the generative model is a diffusion model (e.g., the SDXL diffusion model).

In one embodiment, the prompt construction unit (e.g., the prompt construction unit 124) extracts one or more text elements (e.g., invitation, princess theme, birthday party, Anna . . . ) from the textual content in the first prompt, and generates new text (e.g., "Anna's Birthday Jan. 3, 2023 . . . ," "Birthday party for our princess! . . . ", or the like) from the one or more text elements, and the instruction string comprises instructions to the generative model (e.g., the generative model 126) to insert the new text into one or more text fields in the design template (e.g., the space in the design template 245_a_ in FIG. 2A). The new text may rephrase the text elements in the first prompt, add new text elements extracted from other user data (e.g., user emails, user preferences, and the like), correct errors in the text elements in the first prompt, and/or skip inappropriate content in the first prompt. For example, the prompt construction unit at least corrects one or more typographical errors in the one or more text elements so as to generate the new text, or moderates content in the new text.

In some implementations, the first prompt further includes image content (e.g., the design input 150 in FIG. 1B, the image content 245_g_ in FIG. 2D, or the like), the prompt construction unit (e.g., the prompt construction unit 124) further appends the image content to the instruction string, and the instruction string further comprises instructions to the generative model (e.g., the generative model 126) to use the image content as the design template. In one embodiment, the image content in the first prompt depicts one or more text elements, and the instructions to generate the image (e.g., the graphic design output 245_h_ in FIG. 2D) by replacing comprises: (1) identifying the one or more text elements (e.g., First: this is the first step of the pipeline Second: this is the second step of the pipeline Third . . . in the design input 150 of FIG. 1B) depicted in the image content using an optical character recognition tool (e.g., the OCR tool 132) and remove the one or more text elements from the image content (e.g., the design input 150 in FIG. 1B) to provide a textless image (e.g., the textless image 160 in FIG. 1B); (2) generating a mask image (e.g., the mask image 170 in FIG. 1B) with one or more mask boxes (e.g., the mask boxes 174_a_-174_e_) corresponding to the identified one or more text elements; (3) applying an instance segmentation tool (e.g., the instance segmentation tool 134) to identify one or more visual elements in un-masked areas defined based on the mask image (e.g., the mask image 170 in FIG. 1B) and the textless image (e.g., the textless image 160 in FIG. 1B); and (4) replacing the one or more visual elements (e.g., the visual elements 154_a_-154_e_ depicting various factory facilities in the textless image 160 in FIG. 1B) in the textless image with one or more corresponding thematic variations (e.g., the thematic/Halloween variations 184_a_-184_e_ in the design template 180) using an inpainting tool (e.g., the inpainting tool 136).

In one embodiment, the instruction string comprises instructions to the generative model to modify the image based on one or more design guidelines, the one or more design guidelines specifying at least one of a color palette, a typography, or an imagery style. For example, the one or more design guidelines include a brand kit (e.g., the brand kit 245_i_ in FIG. 2D).

In step 506, the request processing module 122 provides the image (e.g., the graphic design output 245_b_ in FIG. 2A, the graphic design outputs 245_h_, 245_j_ in FIG. 2D, or the like) to the client device (e.g., the client device 105). In step 508, the request processing module 122 causes the user interface (e.g., the user interface 205) to present the image. In one embodiment, the request processing module 122 generates an invitation (e.g., "Would you like to change the birthday invitation?") for the user to edit the image (e.g., the graphic design output 245_b_ in FIG. 2A, the graphic design outputs 245_h_, 245_j_ in FIG. 2D, or the like) to the client device (e.g., the client device 105), provides the invitation with the image to the client device (e.g., the client device 105), and cause the user interface (e.g., the user interface 205) to present the invitation in conjunction with the image.

In another embodiment, the request processing module 122 or the prompt construction unit 124 performs content moderation on the image before providing the image to the client device (e.g., the client device 105). After the content moderation, the request processing module 122 or the prompt construction unit 124 adds the image as an additional design template in a design template library (e.g., the design template library 142). In addition, the request processing module 122 or the prompt construction unit 124 adds metadata associated with the image in the design template library, the metadata comprising at least one of the artifact (e.g., a birthday invitation) extracted from the textual content, the theme (e.g., princess) extracted from the textual content, the one or more visual elements after replacing (e.g., the thematic/Halloween variations 184_a_-184_e_ in FIG. 1B, the thematic/princess variations in FIG. 2A), the graphic layout of the design template (e.g., the design template 180 in FIG. 1B, the design template 245_a_ in FIG. 2A, or the like), or new text (e.g., "Anna's Birthday Jan. 3, 2023 . . . ) added to the image, and later retrieves the additional design template based on the metadata in response to query.

In some implementations, the system can share the graphic design output immediately, so that the user can promote the relevant event (e.g., Anna's Birthday party). In other implementations, the system can start a new chat to help the user to plan the events by suggesting an action plan with steps. For example, when the user organizes a birthday party, this would often involves setting a budget, creating a guest list, planning the food and drinks, arranging entertainment, reserving and then decorating the venue, and the like. In other implementations, the system can perform the actions of the event on behalf of the user, such as setting the budget for the birthday party, reserving the venue, and the like.

Therefore, the system provides theme-based graphic designs to match a user's intent, such as starting with a text prompt with a user-desired artifact, intent and theme. The system fetches one or more design templates matching the requested artifact and applies variations to it to personalize the design created with the defined theme or elements (e.g., a dinosaur theme, or purple flows, or a tropical forest).

Alternatively, the system provides thematic variations based on a design input (e.g., an image) from a user has, such as starting with a design/assets owned/uploaded by the user and a user prompt. Similarly, the system uses the user image/design as the design template, detects and masks text areas and applies thematic variations to personalize the user provided design/image. In addition, the system can modify the design template by applying variations with control on brand colors, style, brand voice, and the like.

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In an example, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data (especially user data) is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

Referring back to the moderation services, the moderation services generates a blocked content notification in response to determining that the user prompt(s), and/or the meta prompt includes potentially objectionable or offensive content, and the notification is provided to the native application 114 or the browser application 112 so that the notification can be presented to the user on the client device 105. For instance, the user may attempt to revise and resubmit the user prompt(s). As another example, the system may generate another meta prompt after removing task data associated with the potentially objectionable or offensive content.

The prompt submission unit 304 submits the formatted/meta prompt to the generative model 126. The generative model 126 analyzes the prompt and generates a graphic design output based on the formatted/meta prompt. The prompt submission unit 304 submits the graphic design output generated by the generative model 126 to the moderation services to ensure that the graphic design does not include any potentially objectionable or offensive content. The prompt formatting unit 302 can halt the processing of the graphic design output in response to the moderation services determining that the graphic design includes potentially objectionable or offensive content. The moderation services generates a blocked content notification in response to determining that the graphic design includes potentially objectionable or offensive content, and the notification is provided to the prompt formatting unit 302. The prompt formatting unit 302 may attempt to revise and resubmit the graphic design output. If the moderation services does not identify any issues with the graphic design output by the generative model 126 in response to the meta prompt, the prompt submission unit 304 provides the graphic design output to the request processing unit 122. The request processing unit 122 provides the graphic design output to the native application 114 or the browser application 112 depending upon which application was the source of the graphic design request.

The moderation services performs several types of checks on the graphic design output(s) being accessed or modified by the user in the native application 114 or the browser application 112, the natural language prompt input by the user, the user data obtained from the user database 128, and/or the graphic design output generated by the generative model 126. The moderation services can be implemented by a machine learning model trained to analyze the content of these various inputs and/or outputs to perform a semantic analysis on the content to predict whether the content includes potentially objectionable or offensive content. The moderation services can perform another check on the content using a machine learning model configured to analyze the words and/or phrase used in content to identify potentially offensive language/image/sound. The moderation services can compare the language used in the content with a list of prohibited terms/images/sounds including known offensive words and/or phrases, images, sounds, and the like. The moderation services can provide a dynamic list that can be quickly updated by administrators to add additional prohibited terms/images/sounds. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services may vary from implementation to implementation. If one or more of these checks determines that the textual/visual content includes offensive content, the moderation services can notify the application services platform 110 that some action should be taken.

In some implementations, the moderation services generates a blocked content notification, which is provided to the client device 105. The native application 114 or the browser application 112 receives the notification and presents a message on a user interface of the application that the user prompt received by the request processing unit 122 could not be processed. The user interface provides information indicating why the blocked content notification was issued in some implementations. The user may attempt to refine a natural language prompt to remove the potentially offensive content. A technical benefit of this approach is that the moderation services provides safeguards against both user-created and model-created content to ensure that prohibited offensive or potentially offensive content is not presented to the user in the native application 114 or the browser application 112.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
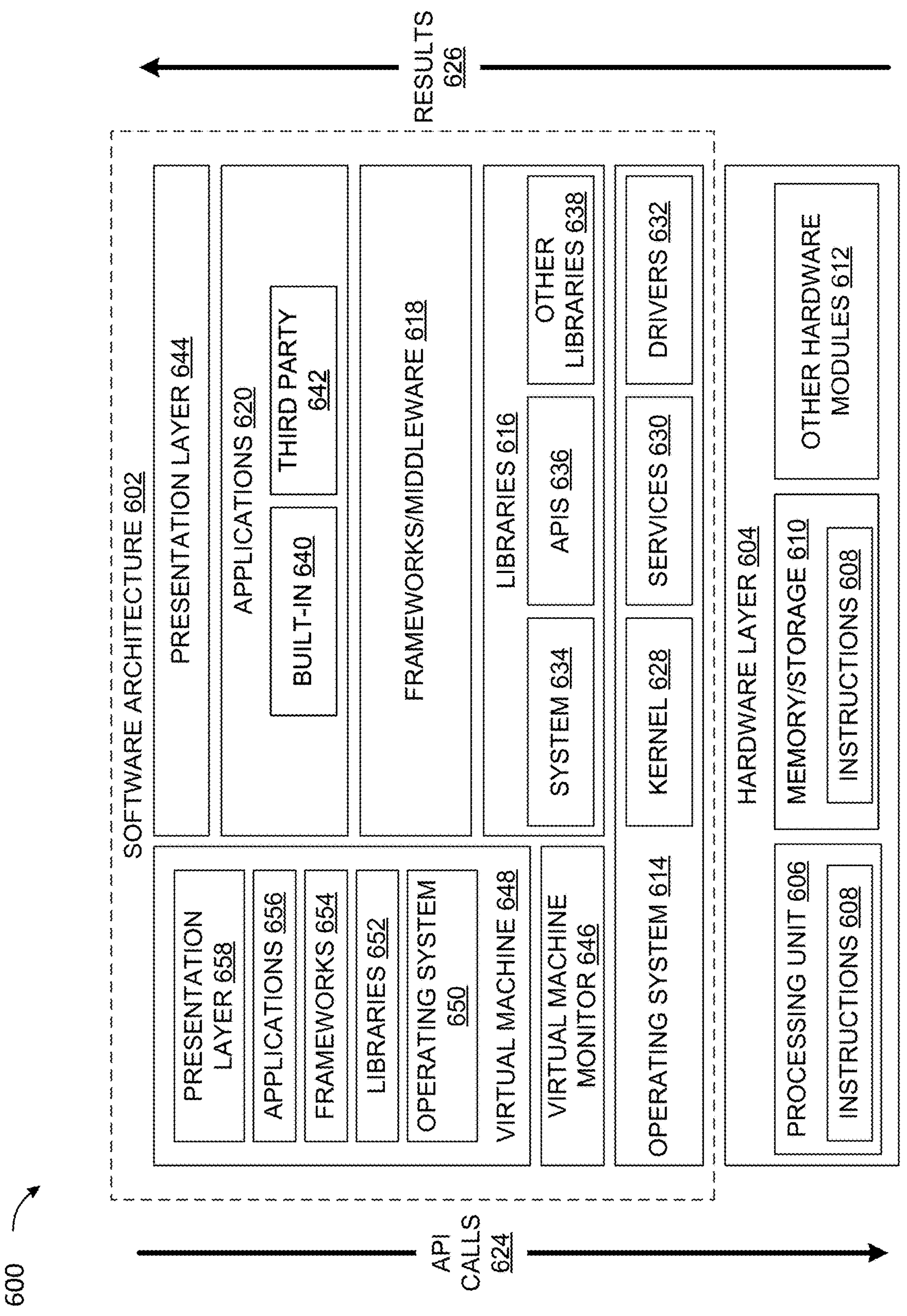
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated if many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712*a* to 712*n* that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per sc.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor, and a machine-readable storage medium storing executable instructions which, when executed by the processor, cause the processor alone or in combination with other processors to perform following operations:

receiving, via a user interface of a client device of a user, a first prompt requesting an image to be generated for the user by a generative model, the first prompt including textual content;

constructing a second prompt by a prompt construction unit as an input to the generative model, the prompt construction unit constructing the second prompt by extracting at least an artifact and a theme from the textual content and appending at least the artifact and the theme to an instruction string, the instruction string comprising instructions to the generative model to determine a design template selected from a design template library that matches the artifact and having a fixed number of text fields and visual elements of a different theme, and to generate the image by identifying one or more visual elements of the design template and replacing the one or more of the visual elements using an inpainting tool based on the different theme while preserving a graphic layout of the design template, the graphic layout including positions and sizes of the text fields and the visual elements of the design template;

providing the image to the client device; and causing the user interface to present the image.

2. The data processing system of claim 1, wherein the prompt construction unit extracts one or more text elements from the textual content in the first prompt, and generates new text from the one or more text elements, and wherein the instruction string comprises instructions to the generative model to insert the new text into one or more of the text fields in the design template.

3. The data processing system of claim 2, wherein the prompt construction unit at least corrects one or more typographical errors in the one or more text elements so as to generate the new text, or moderates content in the new text.

4. The data processing system of claim 2, wherein the first prompt further includes image content, wherein the prompt construction unit further appends the image content to the instruction string, and wherein the instruction string further comprises instructions to the generative model to use the image content as the design template.

5. The data processing system of claim 4, wherein the image content in the first prompt depicts one or more text elements, and wherein the instructions to generate the image comprises:

- identifying the one or more text elements depicted in the image content using an optical character recognition tool and removing the one or more text elements from the image content to provide a textless image;
- generating a mask image with one or more mask boxes corresponding to the one or more text elements;
- applying an instance segmentation tool to identify one or more visual elements in un-masked areas defined based on the mask image and the textless image; and
- replacing the one or more visual elements in the textless image with one or more corresponding thematic variations using an inpainting tool.

6. The data processing system of claim 1, wherein the instruction string comprises instructions to the generative model to:

- modify the image based on one or more design guidelines, the one or more design guidelines specifying at least one of a color palette, a typography, or an imagery style.

7. The data processing system of claim 6, wherein the one or more design guidelines include a brand kit.

8. The data processing system of claim 1, wherein the machine-readable storage medium further includes instructions configured to cause the processor alone or in combination with other processors to perform operations of:

- generating an invitation for the user to edit the image;
- providing the invitation with the image to the client device; and
- causing the user interface to present the invitation in conjunction with the image.

9. The data processing system of claim 1, wherein the machine-readable storage medium further includes instructions configured to cause the processor alone or in combination with other processors to perform operations of:

- performing content moderation on the image before providing the image to the client device.

10. The data processing system of claim 9, wherein the machine-readable storage medium further includes instructions configured to cause the processor alone or in combination with other processors to perform operations of:

- after the content moderation, adding the image as an additional design template in a design template library.

11. The data processing system of claim 10, wherein the machine-readable storage medium further includes instructions configured to cause the processor alone or in combination with other processors to perform operations of:

- adding metadata associated with the image in the design template library, the metadata comprising at least one of the artifact extracted from the textual content, the theme extracted from the textual content, the one or more visual elements after replacing, the graphic layout of the design template, or new text added to the image; and
- retrieving the additional design template based on the metadata in response to query.

12. The data processing system of claim 1, wherein the prompt construction unit includes a language model, and the generative model is a diffusion model.

13. A method comprising:

- receiving, via a user interface of a client device of a user, a first prompt requesting an image to be generated for the user by a generative model, the first prompt including textual content and image content depicting one or more text elements;
- constructing a second prompt by a prompt construction unit as an input to the generative model, the prompt construction unit constructing the second prompt by extracting at least an artifact and a theme from the textual content and appending at least the image content, the artifact, and the theme to an instruction string, the instruction string comprising instructions to the generative model to determine a design template matching the artifact and having a fixed number of text fields and visual elements of a different theme, and to generate the image by:
  - identifying the one or more text elements depicted in the image content using an optical character recognition tool and removing the one or more text elements from the image content to provide a textless image;
  - generating a mask image with one or more mask boxes corresponding to the one or more text elements;
  - applying an instance segmentation tool to identify one or more visual elements in un-masked areas defined based on the mask image and the textless image; and
  - replacing one or more of the visual elements in the textless image with one or more corresponding thematic variations using an inpainting tool while preserving a graphic layout of the design template;
- providing the image to the client device; and
- causing the user interface to present the image.

14. The method of claim 13, wherein the prompt construction unit extracts one or more text elements from the textual content in the first prompt, and generates new text from the one or more text elements, and wherein the instruction string comprises instructions to the generative model to insert the new text into one or more of the text fields in the design template.

15. The method of claim 14, wherein the prompt construction unit at least corrects one or more typographical errors in the one or more text elements so as to generate the new text, or moderates content in the new text.

16. The method of claim 14, wherein the first prompt further includes image content, wherein the prompt construction unit further appends the image content to the instruction string, and wherein the instruction string further comprises instructions to the generative model to use the image content as the design template.

17. A non-transitory computer readable medium on which are stored instructions that, when executed, cause a programmable device to perform functions of:

- receiving, via a user interface of a client device of a user, a first prompt requesting an image to be generated for the user by a generative model, the first prompt including textual content;
- constructing a second prompt by a prompt construction unit as an input to the generative model, the prompt construction unit constructing the second prompt by extracting at least an artifact and a theme from the textual content and appending at least the artifact and the theme to an instruction string, the instruction string comprising instructions to the generative model to determine a design template selected from a design template library that matches the artifact and having a fixed number of text fields and visual elements of a different theme, and to generate the image by identifying one or more visual elements of the design template and replacing the one or more of the visual elements using an inpainting tool based on the different theme while preserving a graphic layout of the design template, the graphic layout including positions and sizes of the text fields and the visual elements of the design template;

providing the image to the client device; and causing the user interface to present the image.

18. The non-transitory computer readable medium of claim 17, wherein the prompt construction unit extracts one or more text elements from the textual content in the first prompt, and generates new text from the one or more text elements, and wherein the instruction string comprises instructions to the generative model to insert the new text into one or more of the text fields in the design template.

19. The non-transitory computer readable medium of claim 18, wherein the prompt construction unit at least corrects one or more typographical errors in the one or more text elements so as to generate the new text, or moderates content in the new text.

20. The non-transitory computer readable medium of claim 18, wherein the first prompt further includes image content, wherein the prompt construction unit further appends the image content to the instruction string, and wherein the instruction string further comprises instructions to the generative model to use the image content as the design template.

* * * * *